United States Patent
Blackman et al.

(10) Patent No.: US 8,373,879 B1
(45) Date of Patent: Feb. 12, 2013

(54) APPARATUS AND METHOD FOR GENERATING REAL TIME MAIL

(75) Inventors: David H. Blackman, Moreno Valley, CA (US); Yasser Roushdy, Anaheim Hills, CA (US)

(73) Assignee: First American Title Insurance Company, Irvine, CA (US)

(*) Notice: Subject to any disclaimer, the term of this patent is extended or adjusted under 35 U.S.C. 154(b) by 1311 days.

(21) Appl. No.: 12/101,053

(22) Filed: Apr. 10, 2008

(51) Int. Cl.
*G06F 15/00* (2006.01)
*G06F 3/12* (2006.01)
*G06K 1/00* (2006.01)

(52) U.S. Cl. ................................ 358/1.15; 358/1.13
(58) Field of Classification Search .............. 358/1.15, 358/1.14, 1.13, 1.1
See application file for complete search history.

(56) References Cited

U.S. PATENT DOCUMENTS

| | | | |
|---|---|---|---|
| 5,521,815 A | 5/1996 | Rose, Jr. | |
| 5,692,206 A | 11/1997 | Shirley et al. | |
| 6,076,064 A | 6/2000 | Rose, Jr. | |
| 6,766,322 B1 | 7/2004 | Bell | |
| 6,873,992 B1 | 3/2005 | Thomas | |
| 7,076,452 B2 | 7/2006 | Florance et al. | |
| 7,092,957 B2 | 8/2006 | Klein | |
| 7,171,389 B2 | 1/2007 | Harrison | |
| 7,283,909 B1 | 10/2007 | Olsen et al. | |
| 8,189,229 B2 * | 5/2012 | Mori ............................ 358/1.18 | |
| 2002/0029194 A1 | 3/2002 | Lewis et al. | |
| 2003/0009345 A1 | 1/2003 | Thorpe | |
| 2003/0036922 A1 | 2/2003 | Fries | |
| 2003/0177071 A1 | 9/2003 | Treese et al. | |
| 2003/0187849 A1 | 10/2003 | Ruby et al. | |
| 2004/0019508 A1 | 1/2004 | Yaruss et al. | |
| 2004/0019544 A1 | 1/2004 | Yaruss et al. | |
| 2004/0044696 A1 | 3/2004 | Frost | |
| 2004/0059653 A1 | 3/2004 | Verkuylen et al. | |
| 2004/0153432 A1 | 8/2004 | O'Halloran et al. | |
| 2005/0004927 A1 | 1/2005 | Singer | |
| 2005/0060203 A1 | 3/2005 | LaJoie et al. | |
| 2005/0159963 A1 | 7/2005 | Gotschall | |
| 2005/0187863 A1 | 8/2005 | Whinery et al. | |
| 2005/0209867 A1 | 9/2005 | Diesch et al. | |
| 2005/0209873 A1 | 9/2005 | Anastasi | |
| 2005/0209987 A1 | 9/2005 | Beres et al. | |
| 2005/0210048 A1 | 9/2005 | Beres et al. | |
| 2005/0210068 A1 | 9/2005 | Szymanski et al. | |
| 2006/0020541 A1 | 1/2006 | Gommlich | |
| 2006/0026136 A1 | 2/2006 | Drucker et al. | |
| 2008/0158594 A1 * | 7/2008 | Kim ............................ 358/1.15 | |

OTHER PUBLICATIONS

Wikipedia, Search engine (computing), http://en.wikipedia.org/w/index.php?title=Search_engine_(computing)&oldid=24305510, Sep. 29, 2005.
ILOG, ILOG: Business Rule Management, http://web/archive.org/web/20050103025112/http://www.ilog.com/, Jan. 3, 2005.
"LegalWriter: Automate your legal survey descriptions. CADalyst, v 16, n 10, p. 35, Oct. 1999".

*Primary Examiner* — Douglas Tran
(74) *Attorney, Agent, or Firm* — Snell & Witmer, LLP (57) ABSTRACT

The present invention provides an apparatus and method for generating a mail package in real time. Electronic mail jobs are sent to a distribution center. At the distribution center, the mail jobs are received and stored in a database. The mail jobs are converted into program control language (PCL) scripts and sent to print centers. The print centers execute the PCL scripts producing documents, tabs and mail labels. The documents are packaged and the mail labels affixed to the packages. The packages are mailed to the customers from the print center.

25 Claims, 9 Drawing Sheets

IMAGE PRINTING SOLUTIONS

IMAGE PRINT NETWORK
Production Sheet — 602
RTM Quality Control Checklist 6.5E

| | | 604 |
|---|---|---|
| Job Receipt | | *459462946* |
| | | 606 |
| FASTRefID | | 459462946 — 608 |
| Time / Date Submitted by Customer | | 2/8/2008 |
| Ship Via | | |
| Tracking Number | | |
|     Print Code | 1 | |
|     Instructions | | |

Simplex 20#; Staple; Double Windows Envelope; Insert Return — 610
Envelope

---

Production     Docutech Operator     ______________ Initials
Pages on Transmittal 9     Actual __________
                        612
__Correct paper
__Image Quality

Finishing     Bindery Operator     ______________ Initials
__Image Quality
__Return Envelope inserted
                        614

Shipping     Shipping Clerk     ______________ Initials
__Binding Correct
__Correct Packaging
                        616
__Barcode Scanned

Date Shipped
_______________________________

Alternate Tracking Information
_______________________________

```
public void PrintNextTab(string text)
{
        string pcl = string.Empty;

// create graphics object
        System.Drawing.Graphics graphics =
frmMain.DefaultInstance.CreateGraphics();

// inject elipse in tab text
        if ( graphics.MeasureString(text, tabFont).Width /
graphics.DpiX * TabDpi > TabWidth)
        {
                while (text.Length > 0)
                {
                        text = text.Substring(0, text.Length - 1);
                        if (graphics.MeasureString(text + "...",
tabFont).Width / graphics.DpiX * TabDpi <= TabWidth)
                        {
                                text = text + "...";
                                break;
                        }
                }
        }

// calculate x (centered)
        int x = TabXOffset
                + (TabWidth * currentTabIndex)
                + (TabPadding * currentTabIndex)
                + (int)(TabWidth / 2.0)
                - (int)(graphics.MeasureString(text, tabFont).Width
/ 2.0 / graphics.DpiX * TabDpi) ;

// set y from the y-offset that comes from database
        int y = this.TabYOffset;

// construct tab page in pcl
        pcl =
                RawPrinterHelper.getEscape("27") + "E"
                + RawPrinterHelper.getEscape("27") + "&l0S"
                                                // simplex
                + RawPrinterHelper.getEscape("27") + "&l101A"
                                                // custom page size (tabs
are approx 9x11)
                + RawPrinterHelper.getEscape("27") + "&l30"
                                                // landscape
                + RawPrinterHelper.getEscape("27") +
"(s16602t0b0s10v1P"
                                                // set to Arial font
                + RawPrinterHelper.getEscape("27") + "&l" +
TabBinNumber.Substring(0, 1) + "H"    // paper source command (feed page)
                + RawPrinterHelper.getEscape("27") + "*p" +
x.ToString().Trim() + "X"        // set x-coord
                + RawPrinterHelper.getEscape("27") + "*p" +
y.ToString().Trim() + "Y"        // set y-coord
                +
text
                                                // text
```

FIG. 8A

```
            +
RawPrinterHelper.getEscape("12")
                                    // ASCII form-feed
        ;

// increment current tab index
    currentTabIndex++;
    if (currentTabIndex > maxTabIndex)
    {
            currentTabIndex = 0;
    }

// convert pcl string to bytes
    byte[] pclBytes = new byte[pcl.Length];
    pclBytes = System.Text.Encoding.UTF8.GetBytes(pcl);
    AddtoPrinterBuffer(pclBytes, false, false, false);

// dispose graphics object
    graphics.Dispose();
```

FIG. 8B

APPARATUS AND METHOD FOR GENERATING REAL TIME MAIL

BACKGROUND

1. Field of the Invention

The present invention relates to generating mail packages. More particularly, the present invention relates to an apparatus and method for quickly generating commercial quality printed materials suitable for distribution to customers through the mail.

2. Related Art

Many industries produce documents, reports and other materials that are sent to a commercial print center. The print center receives the materials in paper or electronic format along with a customer order. The customer order typically contains attributes or details of desired print products. For example, the customer order may specify a type of binding, a size and color of the paper to be used, the number of copies required, and a size, shape, color and type of any document tabs.

The print center prepares the received materials for rendering on one or more commercial printing devices. The rendering process usually involves scanning a number of paper documents or reading an electronic document. If the process involves reading an electronic document, the electronic document usually must be opened using a computer having an application program and operating system compatible with the application program and operating system that created the electronic document. For example, the electronic document may have been created on a computer running the Microsoft XP operating system and the application program Microsoft Publisher 2006. To read and prepare the electronic document for rendering, the print center must have a computer with a computer application capable of reading the electronic document.

As part of the rendering process, the print center manually enters information from the customer order into the computer or directly into printer equipment. In order to process the customer order, the computer or printer equipment generates a rendering script or program in an appropriate printer language such as Printer Control Language (PCL). The rendering script is read by the computer or printer equipment to determine the attributes of the print documents. The rendering script enables the printer equipment to produce print documents according to the customer order.

After printing the documents, the printing center packages the printed documents and ships them back to the customer. Alternatively, the customer may pick up the documents at the print center. After receiving the documents, the customer may inspect the documents, repackage the documents, apply mailing labels to the packages and then mail the packages to the customers. This print process is time consuming, costly and prone to error.

The title industry produces many title products that are electronically assembled before printing. Title products, such as a title portfolio, require an abstractor or title professional to find and assemble data from a variety of databases. The data includes data related to title and encumbrances on a parcel of land and may include, for example, a title history, maps defining a land parcel and a tract, a list of easements on or adjoining the land parcel, a list of the CC&Rs for the land tract, etc. The data will typically be printed out and electronically assembled to produce an integrated document.

The integrated document may then be sent to a print center with an abstractor or other title professional explaining to the print center the attributes of the documents to be printed so that the print center may fulfill the customer order. The print center uses the customer order and the integrated document to generate one or more rendering scripts for the print center's printer equipment. The printer equipment prints the documents and the print center assembles the documents into commercial quality print products. The print center mails the print products to the abstractor or title professional and then mails the print documents to the customer.

This conventional printing process is time consuming. The abstractor or title professional spends a lot of time manually assembling and producing a one of a kind document with instructions from the print center. The print center receives the document, enters print instructions to various print devices and duplicates the documents according to the instructions.

The result of this process is that the abstractor or title professional spends a lot of time working with a local print center to generate commercial quality print products for mailing to title customers. The title company spends time and resources receiving, repackaging, labeling and mailing print products to customers. The print center also spends a lot of time and resources attempting to understanding the title company's orders, updating and maintaining software for reading the abstractor's electronic documents, manually inserting tabs into the documents, and manually labeling, packaging and mailing documents to the title company that are eventually re-mailed to the title company's customers.

Those skilled in the art will recognize that there is a need for an apparatus and method for generating commercial print quality products and directly mailing them to a customer in a very short time frame. The present invention addresses this need as well as others.

SUMMARY

An electronic document such as a title product is sent to a real time mail rendering service center. The real time mail rendering service center receives the electronic document and stores the document in a database. The document is retrieved by a rendering server that generates a printer control language (PCL) script for rendering the document (e.g. a title product, a check, a W-2 form, a W-4 form, etc.) with printer equipment. The PCL script is sent to a print center and one or more documents are printed. The PCL script may also include commands that create unique document tabs and render print mailing labels for each of the documents. The print center packages the documents, affixes mailing labels and mails the documents directly to a customer. The print center and the rendering service center may be ISO 9001 compliant enabling continual process improvement in the distribution of real time mail. The rendering service center may also track production quality of each of the print centers.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

Methods and apparatus that implement the embodiments of the various features of the disclosure will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the present invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the FIG. in which the element first appears.

Figure 1:
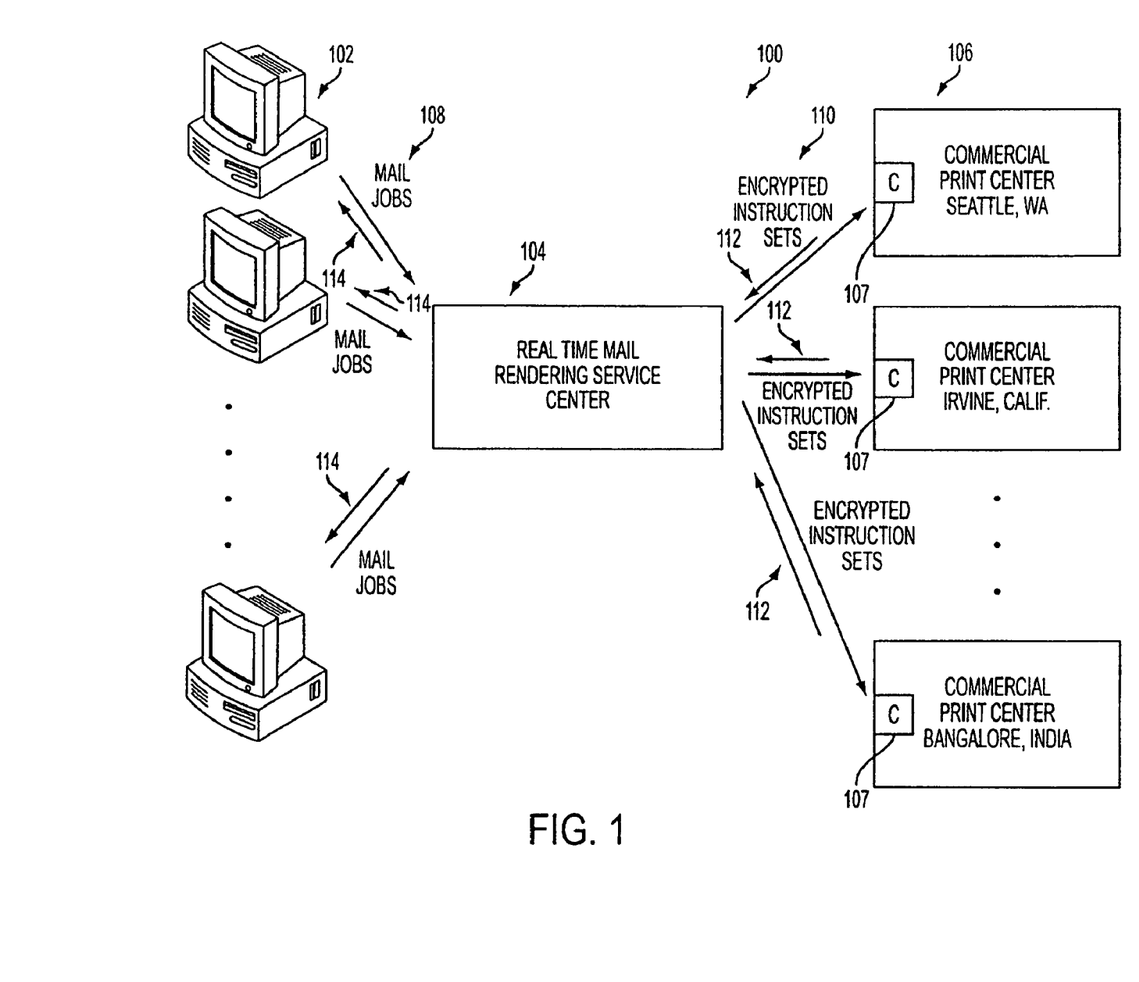
FIG. 1 is a block diagram of a real time mail apparatus according to an embodiment of the present invention.

FIG. 1 is a block diagram of a real time mail apparatus 100 according to an embodiment of the present invention. The real time mail apparatus 100 include a plurality of workstations 102 that communicate with a real time mail rendering service center 104. The real time mail rendering service center 104 in turn communicates with a plurality of print centers 106. Each print center 106 may have a client device 107 for processing information received from the real time mail rendering service center 104.

The plurality of workstations 102 may communicate with the real time mail rendering service center 104 through the internet or any other communication network. The real time mail rendering service center 104 may communicate with the commercial print centers 106 through the internet or any other communication network.

For enhanced security, communication between the plurality of workstations 102, the real time mail rendering service center 104 and the commercial print centers 106 may be accomplished by encrypting the messages sent between the plurality of workstations 102 and the centers 104 and 106. Encryption may be accomplished using public or private key encryption, DES, or any other known secure communication standard or method. The use of a commercial mail service or a courier for communication is also contemplated.

The plurality of workstations 102 may send mail jobs 108 to the real time mail rendering service center 104. The mail jobs 108 may be electronic documents to be printed using commercial print equipment (e.g., Xerox 6300). The mail jobs 108 may contain print attributes of a desired print product. For example, the print attributes may include the type of stapling, the type of binding, the type of cover, the type of hole punching, the paper color, the paper size, the tab attributes (e.g., size, color, shape, position, etc.), the paper orientation (e.g., landscape or portrait), the ink color for each page, the highlighted portions of a page, the color of the highlighted portions (e.g., highlight signature block on page 2 with yellow highlighting), etc. The rendered documents may be punched, packaged or further processed using other commercial print equipment. The mail jobs 108 may also include packaging details such as a client or customer name, a mailing address, a mail service provider (e.g., U.S. postal service, United Parcel Service, Federal Express), a mail priority (e.g., overnight, two day mail), etc.

The real time mail rendering service center 104 may create instruction sets 110 (explained hereinafter) for distribution to commercial print centers 106. The real time mail rendering service center 104 may selectively distribute the instruction sets 110 to individual commercial print centers 106 depending on the packaging details. The real time mail rendering service center 104 may intelligently allocate the distribution of instruction sets to insure that only appropriate print centers receive certain instruction sets. That is, the print center 106 has the required printer equipment and staff to effectively execute the received instruction set.

The real time mail rendering service center 104 may also weigh factors such as cost, proximity to an addressee, reliability, speed of production, etc. to determine the appropriate or optimal commercial print center 106 for routing a particular instruction set. For example, an instruction set for printing a document to be mailed to a resident of Whitefield, India may be routed to a commercial print center in Bangalore, India to insure a speedy delivery of the print product to the Whitefield, India customer. Similarly, an instruction set for rendering a print product for a new high speed color printer may be routed to a specialized print center in Irvine, Calif. having high speed color printers.

The real time mail rendering service center 104 and the associated client devices 107 allow for mass production of individually tailored content. For example, a mail job 108 may include a mass mailing with a coupon for a product or service. The real time mail rendering service center 104 may generate a script for rendering a thousand coupons where each coupon has the name of a targeted customer. Similarly, W-2 forms or W-4 forms vary from employee to employee. The real time mail rendering service center 104 may generate a script for populating these fields for 1000 different employees. Each client device 107 receives the scripts for processing on the commercial print equipment.

Mail job status information 112 is sent from each of the print centers 106 to the real time mail rendering service center 104. The real time mail rendering service center 104 sends status messages 114 to the plurality of workstations 102. The status information 112 and the status messages 114 provide real time status information regarding any mail or print jobs.

Figure 2:
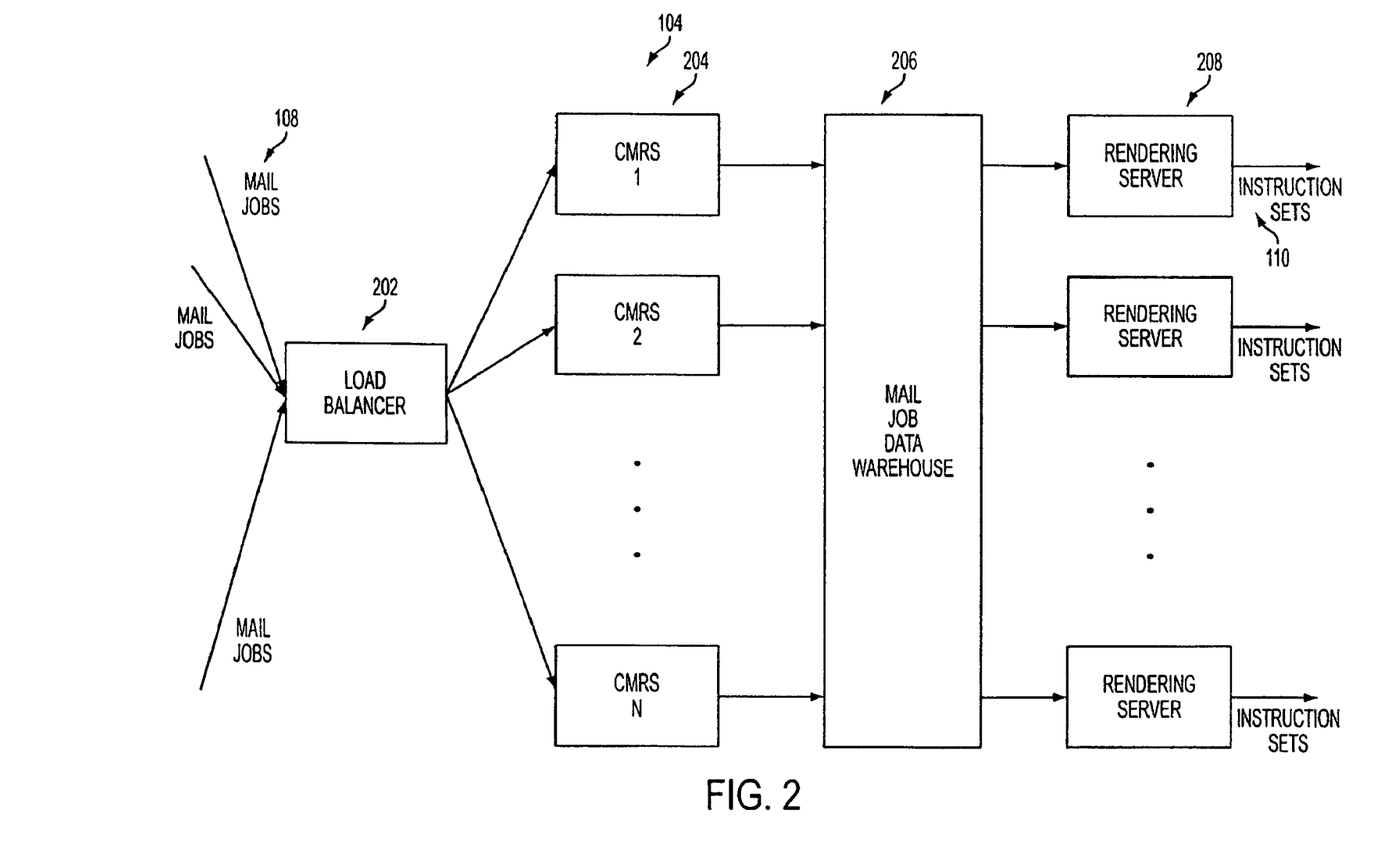
FIG. 2 is a block diagram of the real time mail rendering service center as shown in FIG. 1 according to an embodiment of the present invention.

FIG. 2 is a block diagram of the real time mail rendering service center 104 as shown in FIG. 1 according to an embodiment of the present invention. Mail jobs 108 are routed by a load balancer 202 to one or more computers that make up a centralized mail receiving system 204. The centralized mail receiving system 204 processes the mail jobs 108 and send the processed mail jobs to a mail job data warehouse 206 for temporary storage. The processed mail jobs stored in the mail job data warehouse 206 are retrieved in turn by rendering servers 208. The rendering servers 208 convert the processed mail jobs into instruction sets 110 for routing to individual print centers 106.

The instruction sets 110 created from the mail jobs 108 may include one or more printer scripts for rendering a document using commercial print equipment. The instruction sets 110 may determine the type of document to be produced at the print center such as a standard stapled document, a coil bound booklet with printed tabs, or a three hole punched document in a three ring binder, for example. The instructions sets 110 may also include packaging information such as the mailing addresses, tracking numbers, operator instructions, quality tracking information and shipping information.

The instruction sets 110 may include a printer script in an appropriate language such as printer control language (PCL). The PCL script may have commands for controlling print equipment at a print center reducing operator workload. For example, the PCL script may include drawer and staple commands that specify the printer drawer having the desired paper type, a punch command for punching holes for a three ring binder or a staple command to staple a printed document. This minimizes the amount of operator intervention preventing operator error and misunderstanding at the print center. The PCL script or instruction sets 110 may also specify other document packaging attributes such as the use of standardized or customizable trailer tabs. The PCL script or instruction sets may also command the printer to rotate or oversize an image in the document.

Figure 3:
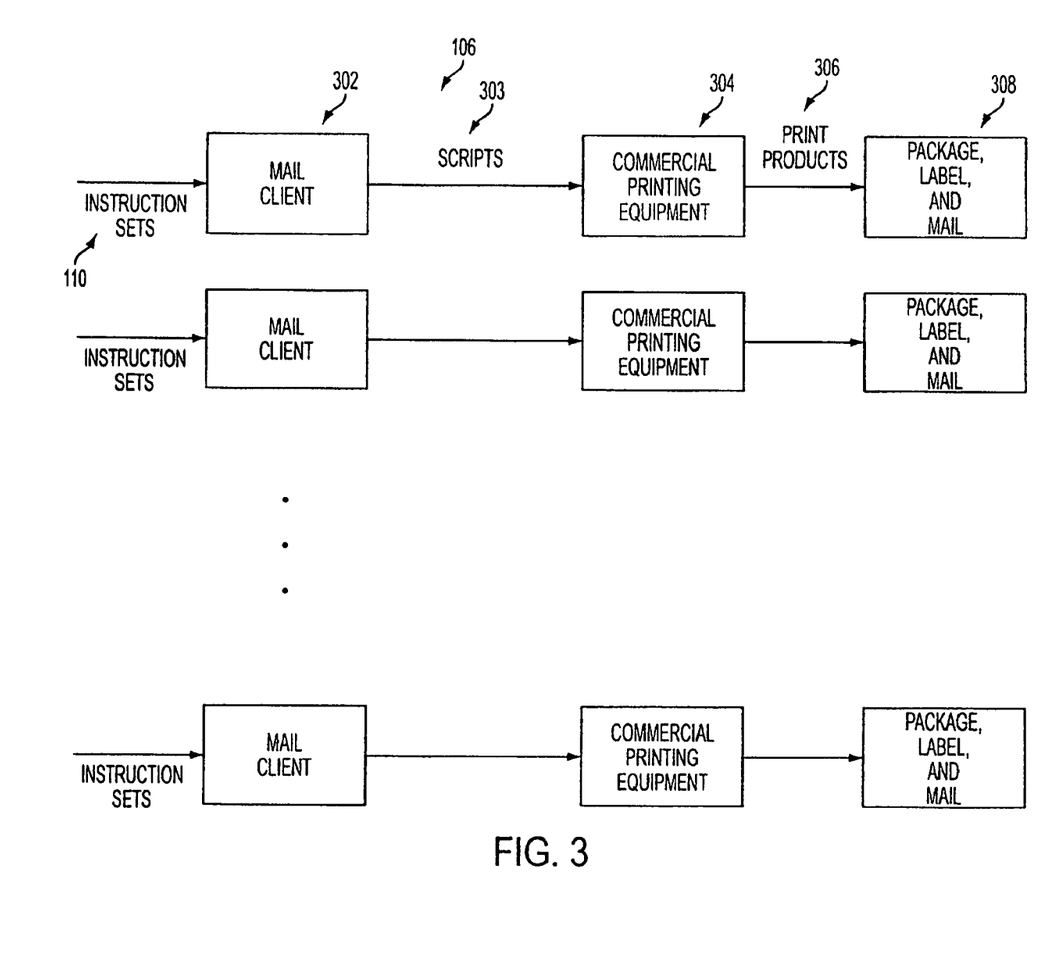
FIG. 3 is a block diagram of the exemplary print centers as shown in FIG. 1 according to an embodiment of the present invention.

FIG. 3 is a block diagram of a print center 106 as shown in FIG. 1 according to an embodiment of the present invention. Each print center 106 may have mail clients 302 that receive the encrypted instruction sets 110 from the real time mail rendering service center (not shown). The mail clients 302 may parse the instruction sets 110 for PCL or other printer scripts 303 so that one or more instruction sets 110 may be executed on one or more pieces of commercial printer equipment 304. The mail clients 302 may forward the scripts 303 to the commercial printer equipment 304 through a local area network or equivalent.

The instruction sets 110 may be encrypted using any commercial encryption technology such as RSA, PGP or DES, for example. The instruction sets 110 are generally encrypted and in alternate embodiments the instruction sets 100 are not encrypted.

To facilitate information security, the print centers 106 may store scripts in volatile memory. In this way, sensitive information such as social security numbers, W-2 information and trust accounting information are not retained by the print centers 106. Other methods of decreasing the print center's 106 electronic and paper footprint such as overwriting scripts and encryption are also contemplated.

Alternatively, the mail client 302 may write the scripts 303 to a digital storage medium for an operator to place in the commercial printer equipment 304. The use of a mail client 302 to print out a script 303 for an operator to manually enter script commands into the commercial print equipment 304 is also contemplated.

The commercial print equipment 304 may generate one or more print products 306 in color or black and white. The print products 306 may include one or more documents and appropriate mailing labels. An operator may collect the print products 306 from one or more pieces of commercial print equipment 304. The operator may package the documents, affix mailing labels and mail the print products 308. The instruction sets 110 may contain packaging, labeling and mailing instructions for an operator.

Figure 4:
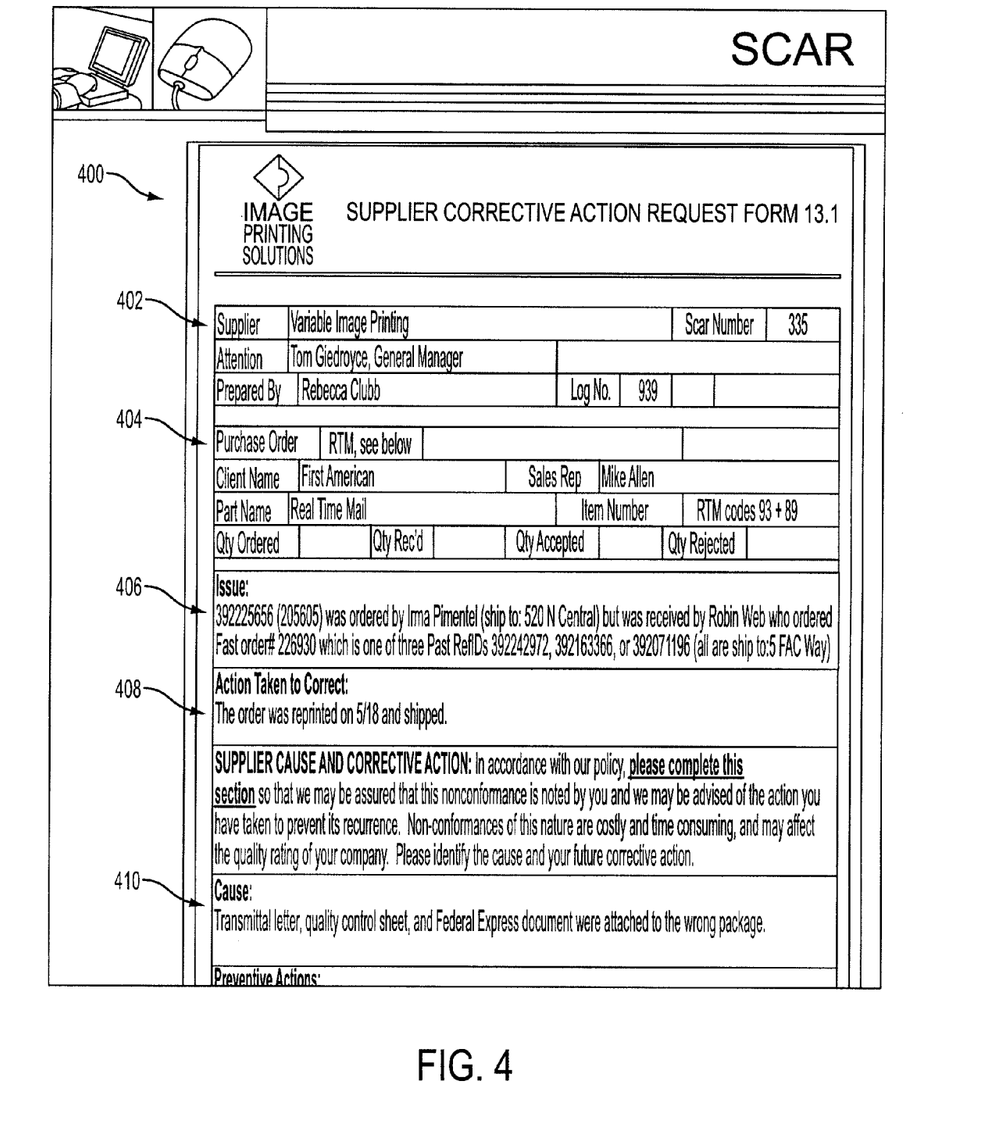
FIG. 4 is an exemplary supplier corrective action form for measuring and tracking process quality at a print center according to an embodiment of the present invention.
Figure 5:
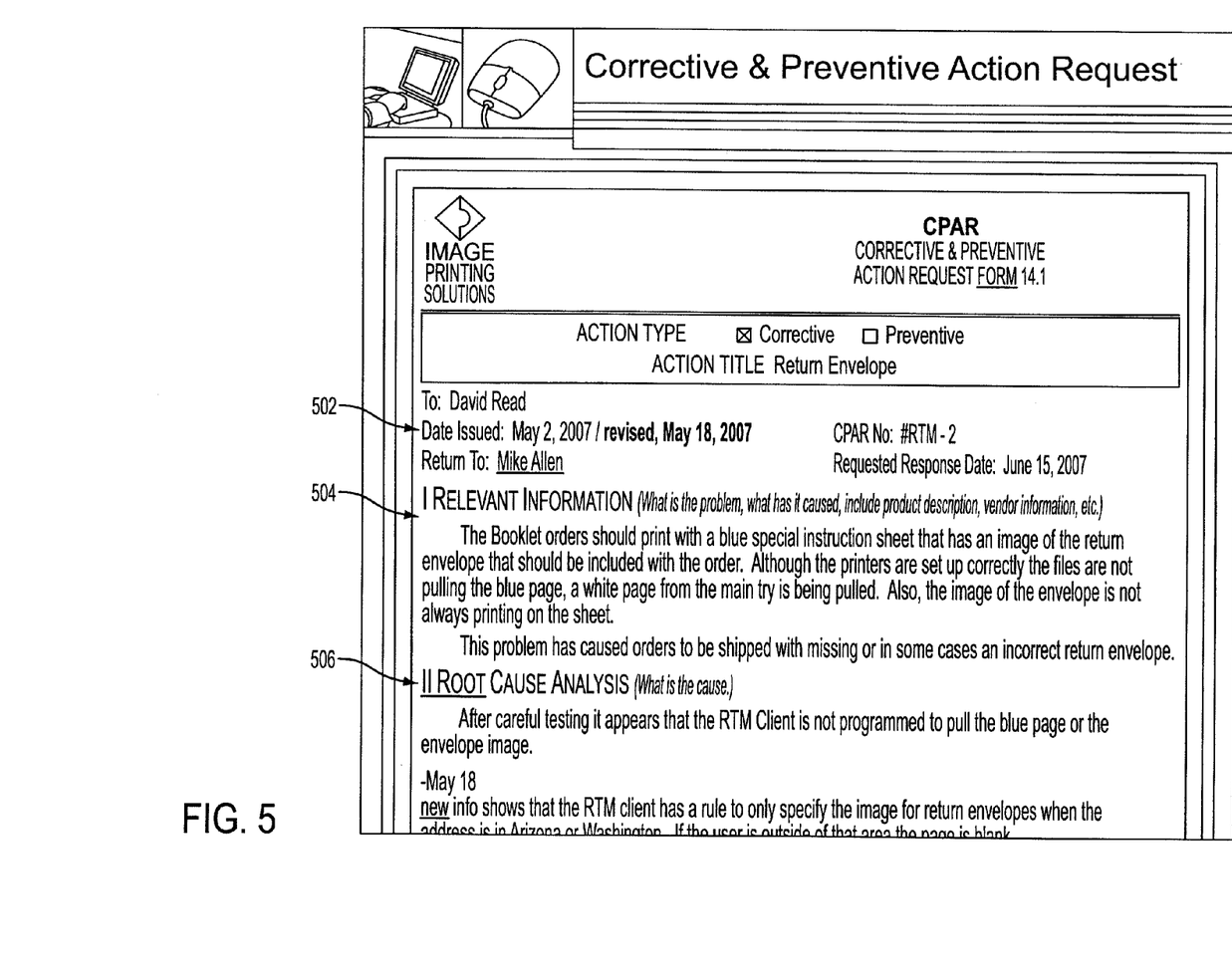
FIG. 5 is an exemplary corrective preventative action request form for correcting system and process deficiencies according to an embodiment of the present invention.

The real time mail rendering service center 104 and the commercial print centers 106 may be International Organization for Standardization (ISO) 9001 compliant. Compliance with a quality standard such as ISO 9001 allows for continual apparatus and process improvement of the real time mail system and processes. FIGS. 4 and 5 show exemplary forms that may be used to continually improve the real time mail system and process and to monitor and measure quality at each of the commercial print centers 106.

FIG. 4 shows an exemplary Supplier Corrective Action Request (SCAR) form 400. The SCAR form 400 has a supplier section 402 that identifies the print center reporting a corrective action. The SCAR form 400 has a purchase order section 404 that identifies the mail job or instruction set that necessitated a corrective action. An issue section 406 allows the print center 106 to describe the issue and an action section 408 allows the print center 106 to describe the corrective action taken. A cause section 410 allows the print center 106 to describe the cause of the issue.

The use of a SCAR reporting system allows performance tracking of each of the print centers 106 and to isolate problems at each of the print centers 106. SCAR statistics may be used for refining instruction set distribution algorithms at the real time mail rendering service center 104. The SCAR reporting system may also alert a print center 106 to an intermittently failing piece of print equipment or a personnel problem.

FIG. 5 shows a corrective and preventative action request (CPAR) form 500. The CPAR form 500 allows the print centers 106 to report problems or prevent problems. The CPAR form 500 has a reporting section 502 that identifies the type of action required and the person or organization requesting the action. The CPAR form 500 has a first section 504 where the person requesting the action may present relevant information and a second section 506 that allows the persons requesting the action to identify a cause of the problem or potential problem.

The use of a CPAR form 500 allows continual improvement and adaptation of the real time mail system 100. The CPAR form 500 may help to identify software bugs, hardware failures and equipment incompatibility. The CPAR form 500 may also be used for adapting the systems and processes over time. For example, introduction of new equipment and equipment upgrades at print centers 106 may require corresponding changes in the real time mail rendering service center 104. In this embodiment, the CPAR form 500 allows for continual system and process improvements.

Figure 6:
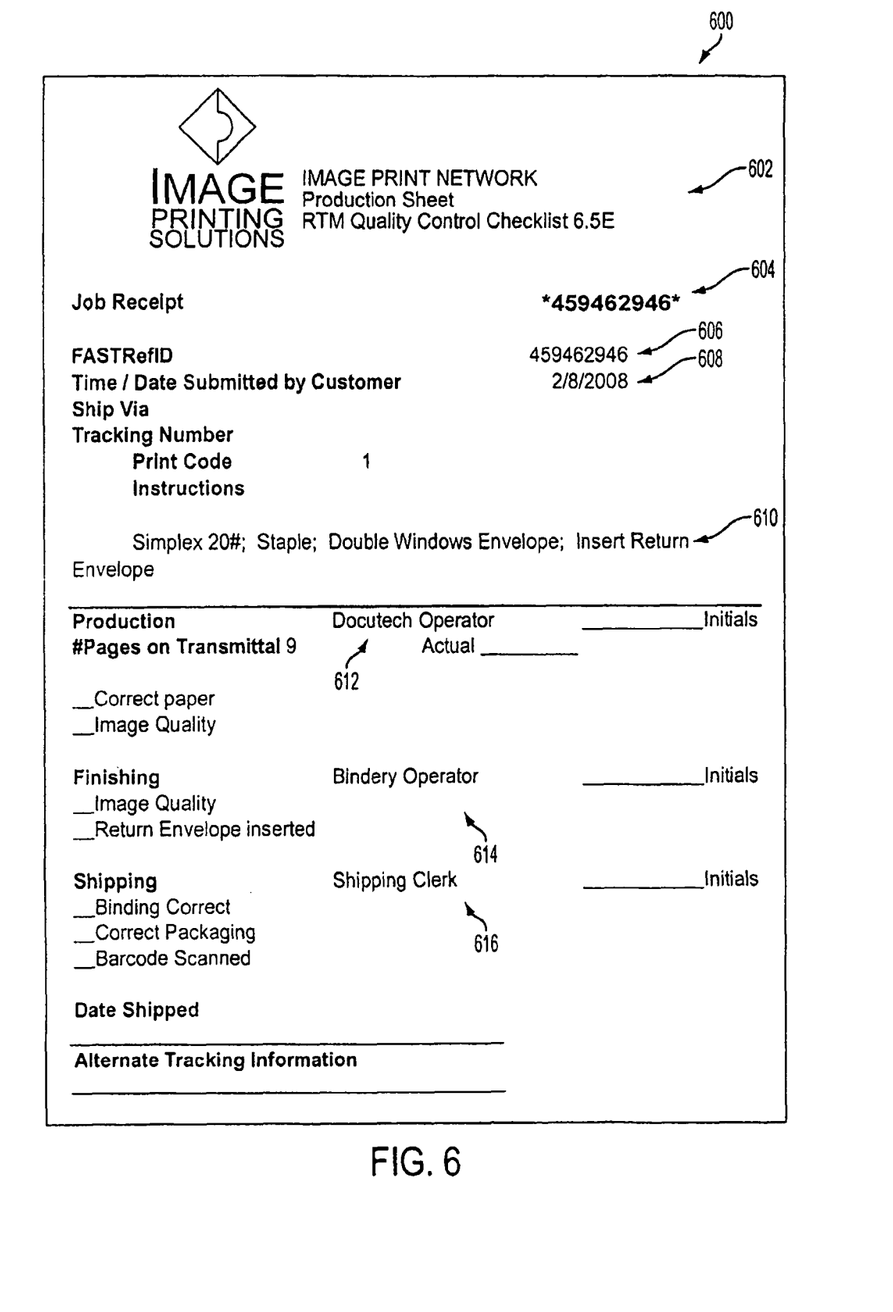
FIG. 6 is an exemplary quality tracking sheet for tracking mail jobs at a print center according to an embodiment of the present invention.

FIG. 6 shows an exemplary quality tracking sheet 600 used at a print center 106. The tracking sheet 600 has a label 602 identifying the name of the print center 106. The tracking sheet 600 also has a job receipt number 604 that identifies the job number. The tracking sheet 600 has a reference number 606, a date submitted by the customer 608, and instructions 610 for the operator.

The tracking sheet 600 has checklist for individual print center operators. The Docutech operator 612 verifies the number of pages, the correct paper and the image quality. The Bindery Operator 614 checks the finishing image quality and the enclosure of a return envelope. The Shipping Clerk 616 verifies the binding is correct, the packaging is correct and whether the document has been scanned.

Figure 7:
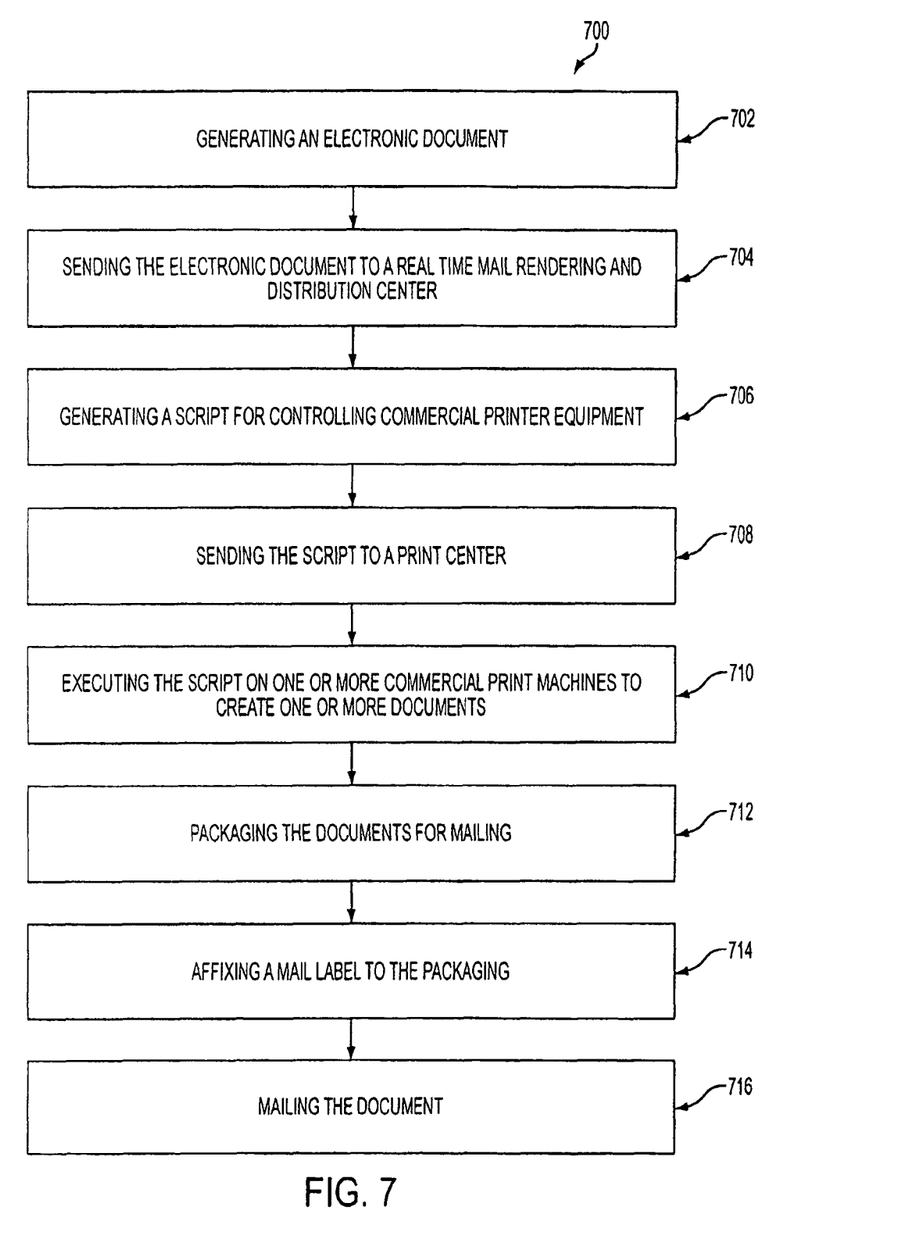
FIG. 7 is a method for generating real time mail according to an embodiment of the present invention.

FIG. 7 shows a method for generating real time mail according to an embodiment of the present invention. An electronic document is generated (702). The electronic document may contain information that a user would like professionally printed documents using commercial print equipment. The electronic document may, for example, be a title opening package, a title commitment or exception listing, a thank you letter, a privacy letter, or a request for information.

The electronic document may be sent to a real time mail rendering service center (704). The electronic document may be sent from any system capable of storing electronic documents. The electronic document may also be a created using an electronic document assembly system that assembles data from multiple databases. The electronic document may be a document created by a proprietary system such as Eagle Pro II. The electronic document may be encrypted for security purposes or placed on an electronic medium for delivery by mail service or courier.

At a real time mail and distribution center, a script for controlling commercial printer equipment may be generated (706). The script may be written in printer control language (PCL) or any other suitable language. The script may command commercial printer equipment to produce a printed document with certain attributes. The printer attributes may include a document binding type, a paper size or color, a tab location and size, etc.

The script may be sent to a print center (708). The print center 106 may also be ISO 9001 compliant. The script may be encrypted prior to transmission to provide security. At the print center the script may be executed on one or more commercial print machines to create one or more documents (712). The documents may be collected by a print center operator and packaged for mailing. A mailing label may be affixed to the packaging (714) and the document may be mailed (716) to a customer.

Figure 8A:
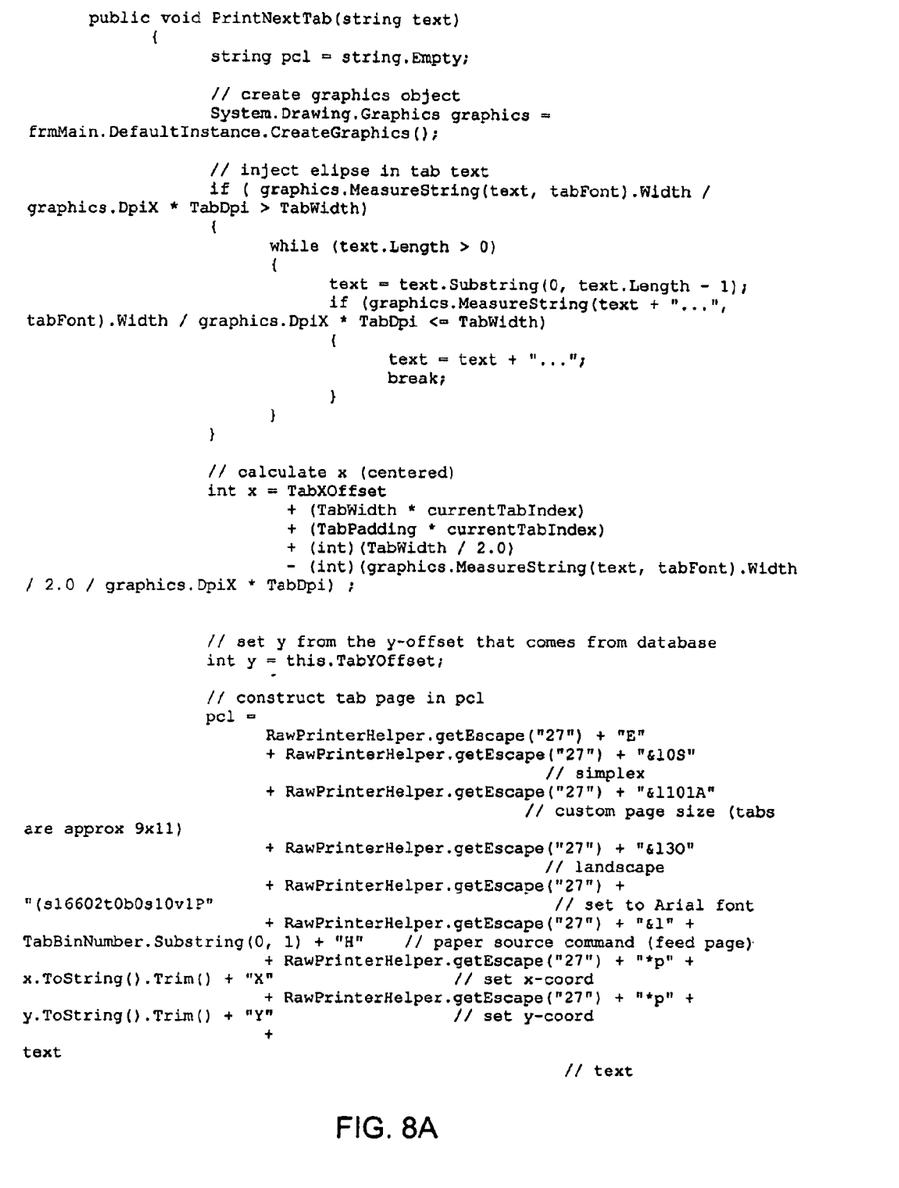
FIGS. 8A and 8B are software code sections or scripts for controlling printer equipment to create document tabs according to an embodiment of the present invention.
Figure 8B:
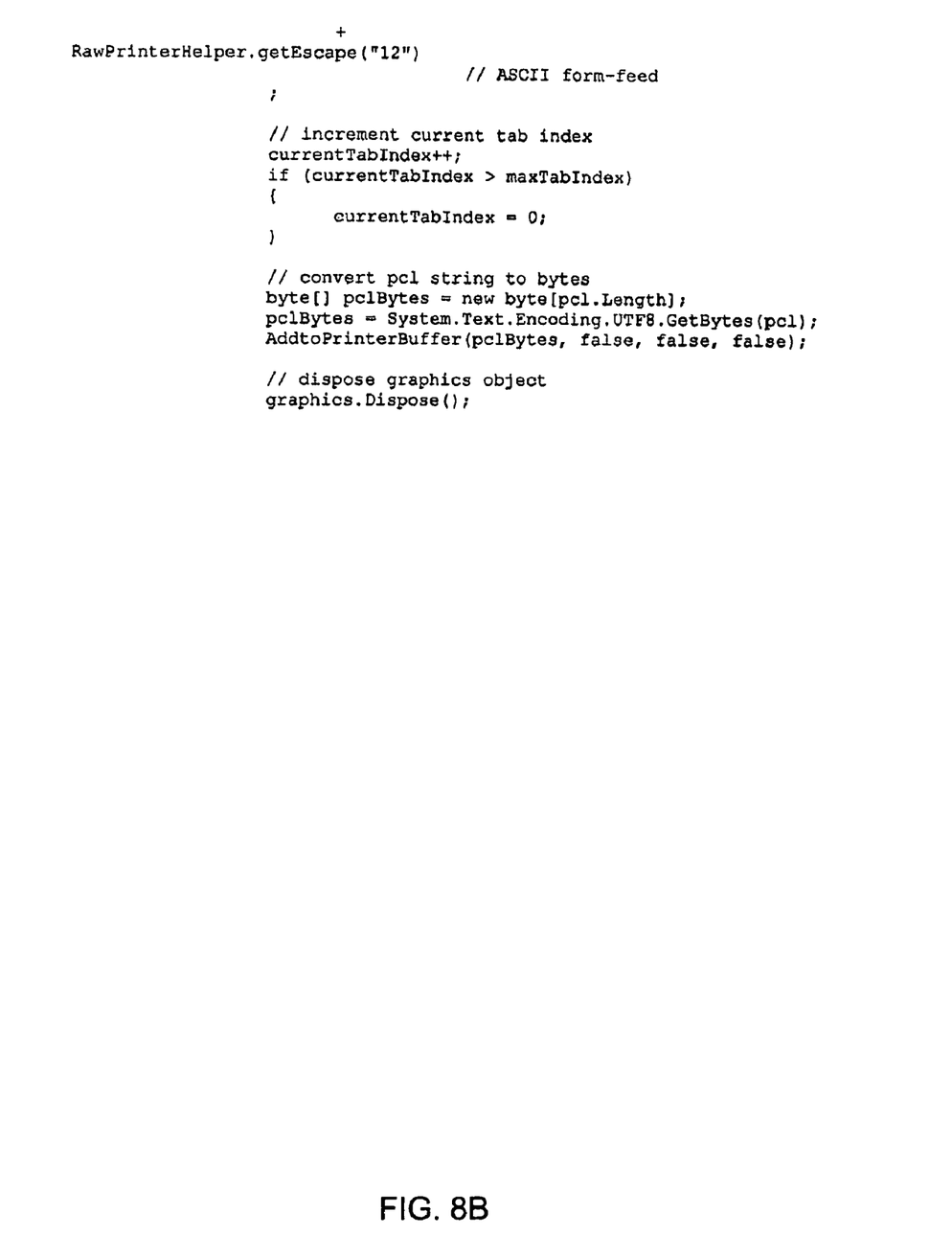

FIGS. 8A and 8B are software code sections or scripts for controlling printer equipment to create document tabs according to an embodiment of the present invention.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for generating mail comprising:
    sending an electronic document to a rendering service processor;
    generating a printer script containing information of the electronic document by the rendering service processor for rendering the electronic document on a commercial printer;
    sending the printer script from the rendering service processor to a print service processor, the print service processor in communication with the commercial printer; and
    printing a physical document corresponding to the electronic document on the commercial printer by using the printer script.

2. The method of claim 1 further comprising receiving a customer order having one or more desired print attributes for the physical document.

3. The method of claim 2 further comprising printing a mailing label for the physical document.

4. The method of claim 3 wherein the customer order has a mailing address for printing on the mailing label.

5. The method of claim 4 further comprising packaging the physical document into a mail package, applying the mailing label to the mail package and mailing the mail package.

6. The method of claim 1 wherein the printer script is a printer control language script.

7. The method of claim 1 wherein the electronic document is sent to the rendering service processor through the internet.

8. The method of claim 1 wherein the printer script is sent from the rendering service processor to the print service processor through the internet.

9. The method of claim 1 wherein the physical document has one or more printed tabs.

10. The method of claim 1 wherein the rendering service processor uses a rule engine for generating the printer script.

11. The method of claim 10 wherein the printer script has instructions for printing and inserting tabs in the physical document.

12. A method of communicating printing information comprising:
    generating an electronic document;
    sending the electronic document to a distribution center processor;
    generating a printer control language script by the distribution center processor, the printer control language script including information of the electronic document for rendering the electronic document; and
    sending the printer control language script to a print center processor.

13. The method of claim 12 wherein the electronic document includes a title product.

14. The method of claim 12 wherein the electronic document includes a tax form.

15. The method of claim 12 wherein the electronic document includes a check.

16. The method of claim 12 wherein the electronic document includes print attributes used in generating the printer control language script.

17. The method of claim 16 wherein the print attributes include an attribute selected from a group of attributes consisting of a binding type, a paper size, a paper color, a tab size and a tab type.

18. The method of claim 16 further comprising printing a physical document based on the electronic document by executing the printer control language script by the print center processor.

19. The method of claim 18 further comprising printing a mailing label, packaging the physical document, affixing the mailing label to the packaged physical document and mailing the packaged physical document.

20. The method of claim 19 wherein the printing of the physical document, the printing of the mailing label, the packaging of the physical document, the affixing of the mailing label to the packaged physical document or the mailing of the packaged physical document is subject to the ISO 9001 quality standard.

21. A printing system comprising:
    a mail receiving processor for receiving an electronic document from a workstation;
    a database connected with the mail receiving processor for storing the electronic document received by the mail receiving processor; and
    a rendering server connected with the database for generating a printer script based on the electronic document.

22. The printing system of claim 21 further comprising a print processor for receiving the printer script from the rendering server.

23. The printing system of claim 21 wherein the printer script is a printer control language script.

24. The printing system of claim 21 wherein the electronic document has a mailing address for a customer.

25. The printing system of claim 21 wherein the electronic document is related to a title product.

* * * * *